(12) United States Patent
Nair et al.

(10) Patent No.: US 9,634,536 B2
(45) Date of Patent: Apr. 25, 2017

(54) SYSTEMS AND METHODS FOR ISOLATING A CONDUIT ENCLOSURE USING AN ADAPTER PLATE FOR AN EXPLOSION PROOF MOTOR

(71) Applicant: General Electric Company, Schenectady, NY (US)

(72) Inventors: Sasidharan Nair, Hyderabad (IN); Praveen Kumar Garlapati, Hyderabad (IN)

(73) Assignee: General Electric Company, Schenectady, NY (US)

( * ) Notice: Subject to any disclaimer, the term of this patent is extended or adjusted under 35 U.S.C. 154(b) by 597 days.

(21) Appl. No.: 13/859,456

(22) Filed: Apr. 9, 2013

(65) Prior Publication Data
US 2014/0265682 A1   Sep. 18, 2014

Related U.S. Application Data

(63) Continuation of application No. 13/840,801, filed on Mar. 15, 2013.

(51) Int. Cl.
H02K 15/14 (2006.01)
H02K 5/136 (2006.01)

(52) U.S. Cl.
CPC .......... H02K 5/136 (2013.01); H02K 15/14 (2013.01); Y10T 29/49009 (2015.01)

(58) Field of Classification Search
CPC .............................. H02K 5/136; H02K 5/225
See application file for complete search history.

(56) References Cited

U.S. PATENT DOCUMENTS 1,799,071 A * 3/1931 Smith ............................. 310/88
2,512,136 A * 6/1950 Brown ............................ 310/57
2,692,373 A * 10/1954 Werner et al. ................ 439/177
(Continued)

FOREIGN PATENT DOCUMENTS

EP   1096614 A2 * 5/2001 ........... H01R 13/527
GB   1031353 A  * 6/1966 ............... H02K 5/12

OTHER PUBLICATIONS

Machine translation of EP 1096614 A2.*
Praveen Kumar Garlapati et al., U.S. Appl. No. 13/840,801, filed Mar. 15, 2013.

*Primary Examiner* — Terrance Kenerly
(74) *Attorney, Agent, or Firm* — Armstrong Teasdale LLP (57) ABSTRACT

An enclosure system includes a stator enclosure defining an enclosure opening, and an adapter having a first entry port, and defines a center cavity having a first volume. Enclosure system includes a conduit enclosure coupled to one or more of stator enclosure and adapter. Conduit enclosure includes a base member having at least one side wall, a rear wall coupled to side wall and defining a second entry port, an interior cavity, and a terminal connection block coupled to base member and having at least one terminal. Enclosure system includes at least one electrical lead extending from the stator enclosure through first enclosure opening, through first entry port, through center cavity, through second entry port, and into the interior cavity. Electrical lead occupies a portion of first volume and leaves a remaining volume. Enclosure system includes sealing compound coupled with adapter such that substantially all of remaining volume is occupied.

18 Claims, 11 Drawing Sheets

(56) References Cited

U.S. PATENT DOCUMENTS

| | | | |
|---|---|---|---|
| 2,778,904 A * | 1/1957 | Jacobi | 200/293 |
| 3,153,695 A * | 10/1964 | Hill et al. | 174/544 |
| 3,739,128 A | 6/1973 | Kaesser et al. | |
| 3,761,601 A | 9/1973 | Kaesser et al. | |
| 3,772,453 A * | 11/1973 | O'Brien | 174/657 |
| 3,779,078 A | 12/1973 | Kaesser et al. | |
| 5,304,880 A * | 4/1994 | Hisada et al. | 310/71 |
| 5,412,272 A * | 5/1995 | Mensching | 310/88 |
| 5,872,410 A * | 2/1999 | Sudoff | 310/68 R |
| 5,889,343 A * | 3/1999 | Bryant et al. | 310/71 |
| 5,949,167 A * | 9/1999 | Blalock et al. | 310/71 |
| 7,012,191 B1 | 3/2006 | Watanabe et al. | |
| 7,288,719 B2 | 10/2007 | Barnhard et al. | |
| 8,120,217 B2 | 2/2012 | Yawata et al. | |
| 8,227,947 B2 | 7/2012 | Oleson et al. | |
| 2004/0072474 A1 * | 4/2004 | Nyblin et al. | 439/709 |
| 2006/0066162 A1 | 3/2006 | Woodson | |
| 2007/0159018 A1 * | 7/2007 | Martin | H02K 5/136 310/88 |
| 2009/0322169 A1 * | 12/2009 | Moody | 310/89 |
| 2011/0031830 A1 | 2/2011 | Oleson et al. | |
| 2011/0108085 A1 | 5/2011 | Quiter | |

\* cited by examiner

SYSTEMS AND METHODS FOR ISOLATING A CONDUIT ENCLOSURE USING AN ADAPTER PLATE FOR AN EXPLOSION PROOF MOTOR

CROSS REFERENCE TO RELATED APPLICATIONS

This application is a continuation of U.S. patent application Ser. No. 13/840,801 filed Mar. 15, 2013, which is hereby incorporated by reference in its entirety.

BACKGROUND

The field of the invention relates generally to explosion proof motors and, more specifically, to systems and methods for isolating a conduit enclosure attached to an explosion proof motor.

The National Fire Protection Association (NFPA) defines an explosion proof apparatus as, an "[a]pparatus enclosed in a case that is capable of withstanding an explosion of a specific gas or vapor that may occur within it and of preventing the ignition of a specified gas or vapor surrounding the enclosure by sparks, flashes, or explosion of the gas or vapor within, and that operates at such an external temperature that a surrounding flammable atmosphere will not be ignited thereby." The explosion proof designation does not ensure that an apparatus is incapable of exploding, but rather that the apparatus is capable of withstanding an explosion without causing damage to the immediate surroundings of the apparatus beyond a certain level.

Explosion proof motors are a class of motors that are constructed to contain an explosion, as well as to prevent the release of gases. Motors regularly include a conduit enclosure, through which electrical leads pass from the motor. For explosion proof motors, the pathways for the electrical leads represent potential paths for explosive flames, forces, and gases. At least some known motors seal the electrical lead pathways from motor to conduit enclosure to contain an explosion within the motor body.

At least some known methods of isolating a conduit enclosure for an explosion proof motor use slow-curing sealing compounds that are poured into molds within the motor's stator assembly. The motor's electrical leads extend through an opening, and packing material insulation sheets are used to isolate an area within the motor stator in which the sealing compound is poured. However, in such motors, the sealing compound must be applied to a large area, which increases the costs and time to manufacture such motors. Moreover, errors during the sealing process may cause the entire motor's stator to be rendered unusable, thus leading to additional manufacturing expenses.

BRIEF DESCRIPTION

In one aspect, an enclosure system is provided. The enclosure system includes a stator enclosure defining a first enclosure opening. The enclosure system also includes an adapter having a first entry port. The adapter defines a center cavity having a first volume. The enclosure system further includes a conduit enclosure coupled to one or more of the stator enclosure and the adapter. The conduit enclosure includes a base member having at least one side wall, a rear wall coupled to the side wall, and an interior cavity. The rear wall defines a second entry port. The conduit enclosure also includes a terminal connection block coupled to the base member and having at least one terminal. The enclosure system also includes at least one electrical lead extending from the stator enclosure through the first enclosure opening, through the first entry port, through the center cavity, through the second entry port, and into the interior cavity. The at least one electrical lead occupies a portion of the first volume and leaves a remaining volume. The conduit enclosure further includes sealing compound coupled with the adapter such that substantially all of the remaining volume is occupied.

In a further aspect, a method of attaching an adapter and a conduit enclosure to a motor stator is provided. The method includes providing an adapter. The adapter includes a first entry port. The adapter also includes a center cavity having a first volume. The method also includes providing a conduit enclosure having a base member, at least one terminal connection block coupled to the base member, at least one side wall, and a rear wall coupled to the side wall. The rear wall includes a second entry port. The base member includes an interior cavity. The method further includes extending at least one electrical lead from the motor stator through the first entry port, through the center cavity, through the second entry port, and into the interior cavity. The at least one electrical lead occupies a portion of the first volume and leaves a remaining volume. The method also includes applying sealing compound to fill a portion of the remaining volume such that a seal is formed. The method further includes attaching the conduit enclosure to the motor stator.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

Unless otherwise indicated, the drawings provided herein are meant to illustrate inventive features of the invention. The inventive features are believed to be applicable in a wide variety of systems including one or more embodiments of the invention. As such, the drawings are not meant to include all conventional features known by those of ordinary skill in the art to be required for the practice of the invention.

DETAILED DESCRIPTION

In the following specification, reference will be made to a number of terms, which shall be defined to have the following meanings. The singular forms "a", "an", and "the" include plural references unless the context clearly dictates otherwise. "Optional" or "optionally" means that the subsequently described event or circumstance may or may not occur, and that the description includes instances where the event occurs and instances where it does not. Moreover, approximating language, as used herein throughout the specification and claims, may be applied to modify any quantitative representation that may permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Figure 1:
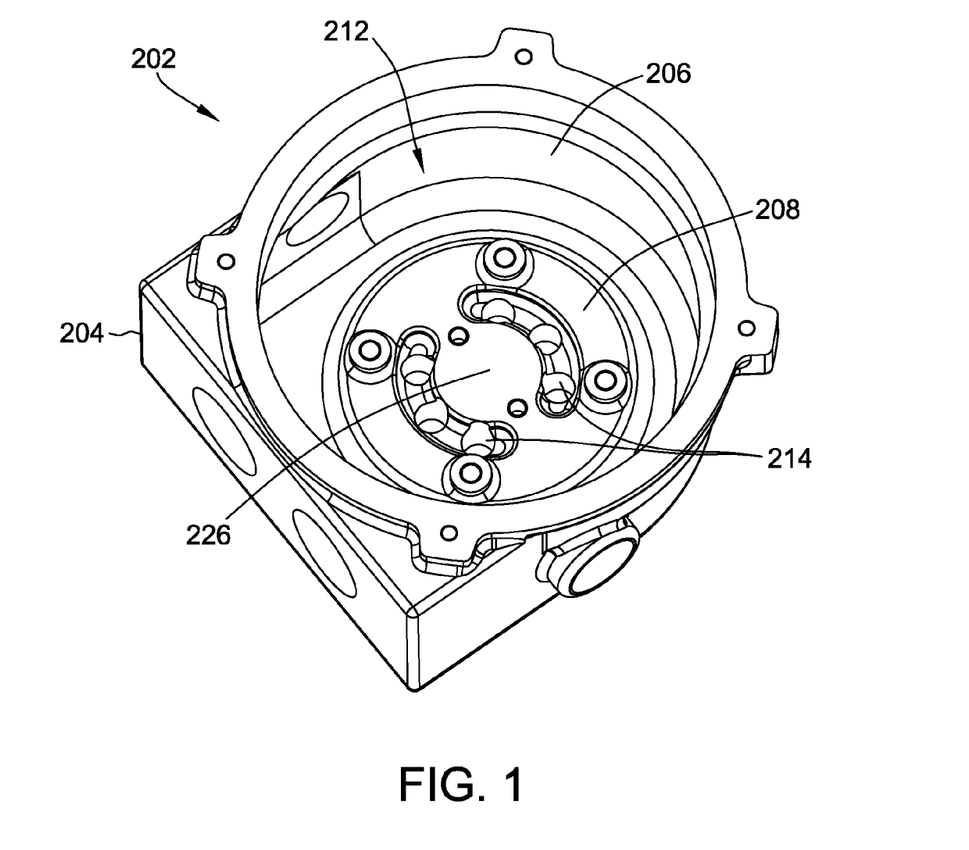
FIG. 1 is a schematic view of an exemplary conduit enclosure that may couple to an electric motor stator.
Figure 2:
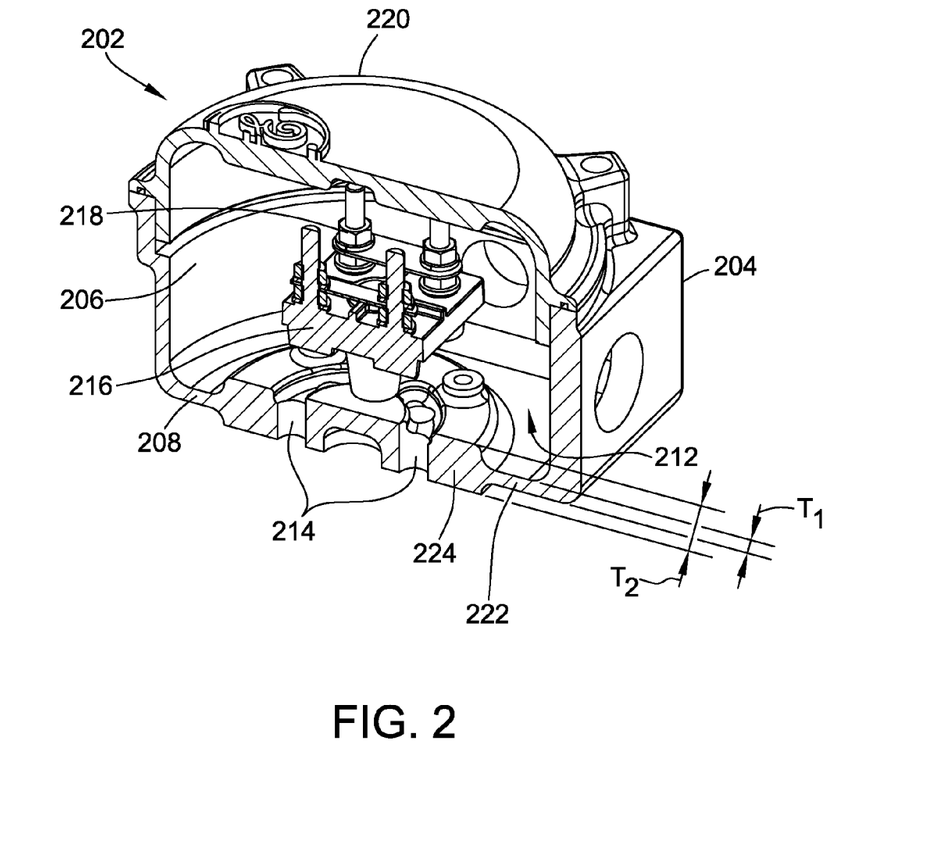
FIG. 2 is a cross-sectional view of the conduit enclosure shown in FIG. 1.
Figure 11:
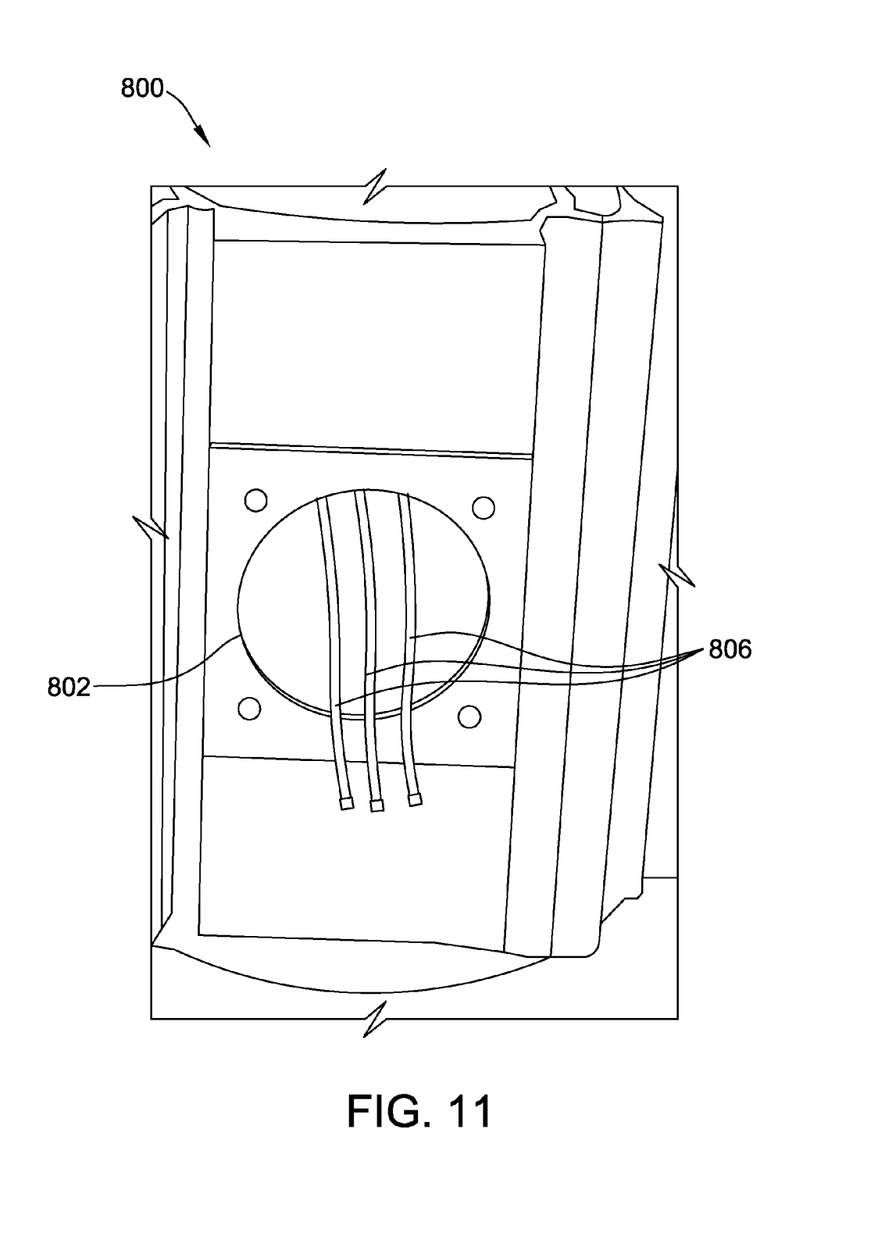
FIG. 11 is a front view of a portion of a stator enclosure defining an enclosure opening.

FIG. 1 is a schematic view of an exemplary conduit enclosure 202 that may couple to an electric motor stator, in particular, an electric motor stator enclosure (shown in FIG. 11). FIG. 2 is a cross-sectional view of conduit enclosure 202. In the exemplary embodiment, conduit enclosure 202 includes a base member 204 that includes at least one side wall 206 and a rear wall 208. Rear wall 208 includes one or more entry ports 214 that each have an interior volume defined therein. Alternatively, entry ports 214 may be defined in any wall of conduit enclosure 202, such as, without limitation, side wall 206, that enables conduit enclosure 202 to function as described herein. In the exemplary embodiment, entry ports 214 are cylindrical, and are spaced circumferentially about a center 226. In some embodiments, rear wall 208 may include a first area 222 having a thickness, $T_1$, and a second area 224 having a thickness, $T_2$, that is thicker than first area 222. Entry ports 214 entry ports 214 are defined within second area 224. Base member 204 has an interior cavity 212 defined therein that may be capped with a cover member 220. Base member 204 also includes a terminal connection block 216 that includes at least one terminal 218, and that may be coupled to rear wall 208.

During assembly, in the exemplary embodiment, one or more electric leads (not shown) from an electric motor stator (not shown) are routed through entry port 214 into interior cavity 212 of conduit enclosure 202. Each electric lead occupies only a portion of the volume defined within entry port 214. Sealing compound is injected into entry port 214 such that the remaining volume of entry port 214 adjacent to each electric lead is substantially filled and such that seal entry port 214 is substantially sealed. Base member 204 is then coupled to the electric motor stator. Alternatively, base member 204 may be coupled to the electric motor stator prior to injecting sealing compound into entry port 214. In the exemplary embodiment, sealing compound may be any material that can be formed into a volume of a passage, and that forms an explosion resistant seal upon curing. For example, in one embodiment, the sealing compound is a fast curing sealing compound. In one particular embodiment, the sealing compound is "Chico® A", made available by Cooper Crouse-Hinds of Syracuse, N.Y. Chico® is a registered trademark of Cooper Crouse-Hinds.

Figure 3:
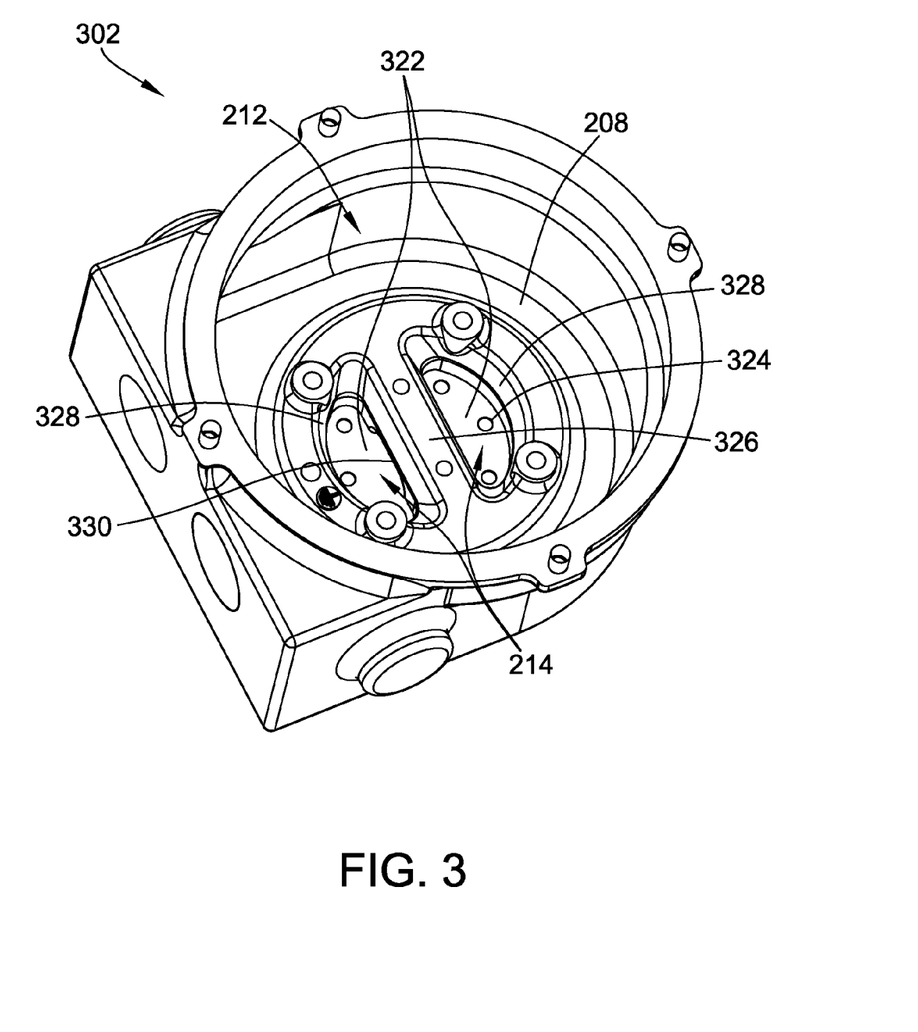
FIG. 3 is a schematic view of an alternative conduit enclosure that may couple to an electric motor stator.

FIG. 3 is a schematic view of an exemplary conduit enclosure 302 that may couple to an electric motor stator (not shown). Enclosure 302 is similar to enclosure 202 (shown in FIGS. 1 and 2) and identical components are identified in FIG. 3 using the same reference numbers used in FIGS. 1 and 2. In the exemplary embodiment, conduit enclosure 302 includes a rear wall 208 having two semi-circular entry ports 214 that are separated by a crossbar 326. A tapered ridge 328 in rear wall 208 surrounds each entry port 214. A slot 330 beneath crossbar 326 connects the entry ports 214. Further, each entry port 214 is covered by insulating paper 322 that is coupled to an outer surface of rear wall 208. Alternatively, insulating paper 322 may be coupled to an inner surface of rear wall 208. Insulating paper 322 includes one or more electrical lead holes 324 defined therein. For example, in one embodiment, "Nomex® Type 410" insulation paper with a 0.02" thickness is used, made available by DuPont of Wilmington, Del. Nomex® is a registered trademark of DuPont.

During assembly, in the exemplary embodiment, insulating paper 322 is coupled to rear wall 208 such that electrical lead hole 324 defined in insulating paper 322 is substantially concentrically aligned with entry port 214. One or more electric leads (not shown) from the electric motor stator are extended through each electrical lead hole 324 and through entry port 214 into enclosure interior cavity 212. Sealing compound is injected into entry port 214 such that the remaining volume of entry port 214 adjacent to electric lead is substantially filled and such that entry port 214 is substantially sealed. Insulating paper 322 restrains sealing compound during application and curing by bordering one side of entry port 214. Tapered ridge 328 provides support for the sealing compound to assist withstanding the pressure from an internal explosion within conduit box 302, thereby preventing solid sealing compound from dislocation. Slot 330 assists during application of sealing compound, and further serves as a support to the sealing compound from an explosion within the motor stator (not shown).

Figure 4:
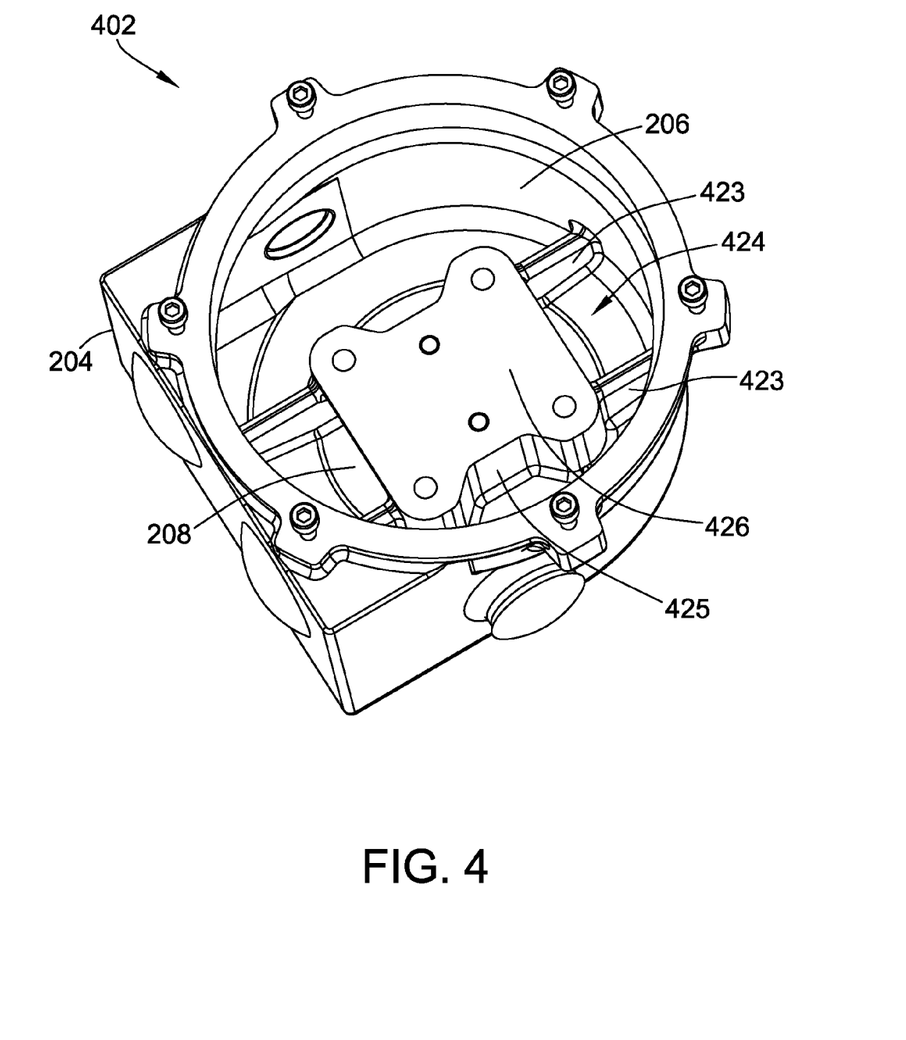
FIG. 4 is a schematic view of another alternative enclosure that may couple to an electric motor stator.
Figure 5:
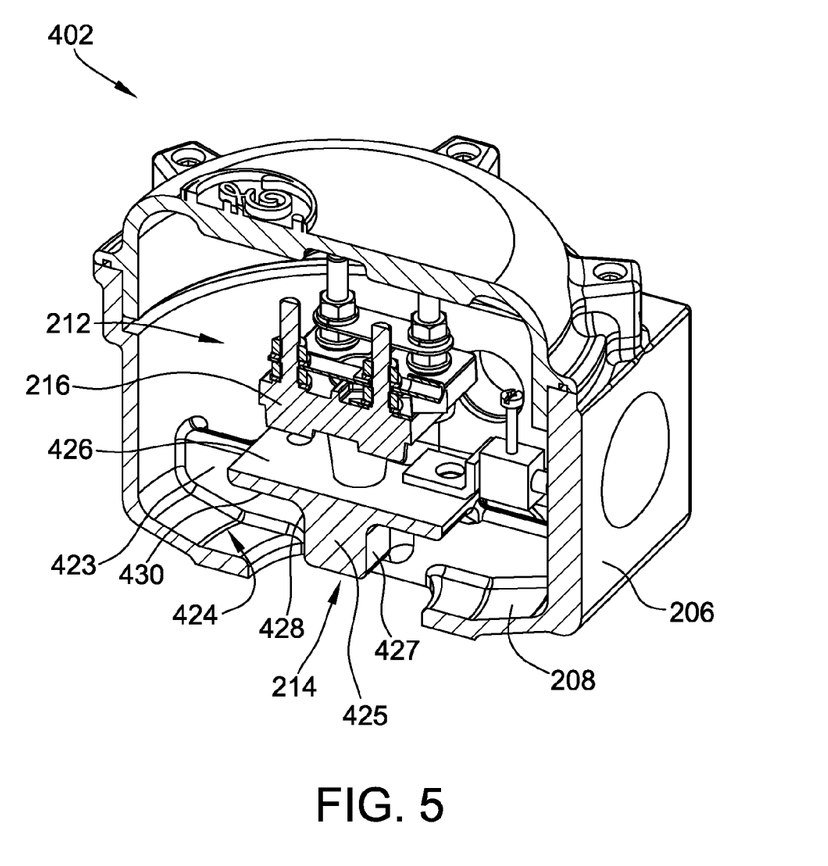
FIG. 5 is a cross-sectional view of the conduit enclosure shown in FIG. 4.

FIG. 4 is a schematic view of another exemplary embodiment of a conduit enclosure 402 that may couple to an electric motor stator (not shown). FIG. 5 is a cross-sectional view of conduit enclosure 402. Enclosure 402 is similar to enclosure 202 (shown in FIGS. 1 and 2) and identical components are identified in FIGS. 4 and 5 using the same reference numbers used in FIGS. 1 and 2. In the exemplary embodiment, conduit enclosure 402 includes two supports 423 coupled to rear wall 208. In some embodiments, supports 423 may also be coupled to side wall 206. A mounting frame 425 is coupled to supports 423. Mounting frame 425 may have a terminal connection block 216 mounted to a base platform 426. Mounting frame 425 includes a rear surface 430. In some embodiments, mounting frame 425 includes a lateral support 427 which, along with rear surface 430, forms a curved transition surface 428. Rear wall 208 defines an entry port 214. A channel 424 is defined between supports 423, by rear wall 208, and by mounting frame 425.

During assembly, in the exemplary embodiment, one or more electric leads (not shown) from an electric motor stator are extended through entry port 214, through channel 424, and into interior cavity 212 of conduit enclosure 402. Sealing compound is injected into channel 424 such that at least some of the remaining volume of channel 424 adjacent to each electric lead is filled such that channel 424 is substantially sealed. In some embodiments, channel 424 may be substantially completely filled with sealing compound. In other embodiments, insulating paper, such as insulating paper 322 (shown in FIG. 3), may be used to border entry port 214 to contain sealing compound during application and curing. In operation, in some embodiments, mounting frame 425 is substantially supported by lateral support 427, and by coupling mounting frame 425 to supports 423. Sealing compound is supported by rear surface 430 during an explosion in the motor stator (not shown), and further supported by rear surface 208 during an explosion within conduit enclosure 402.

Figure 6:
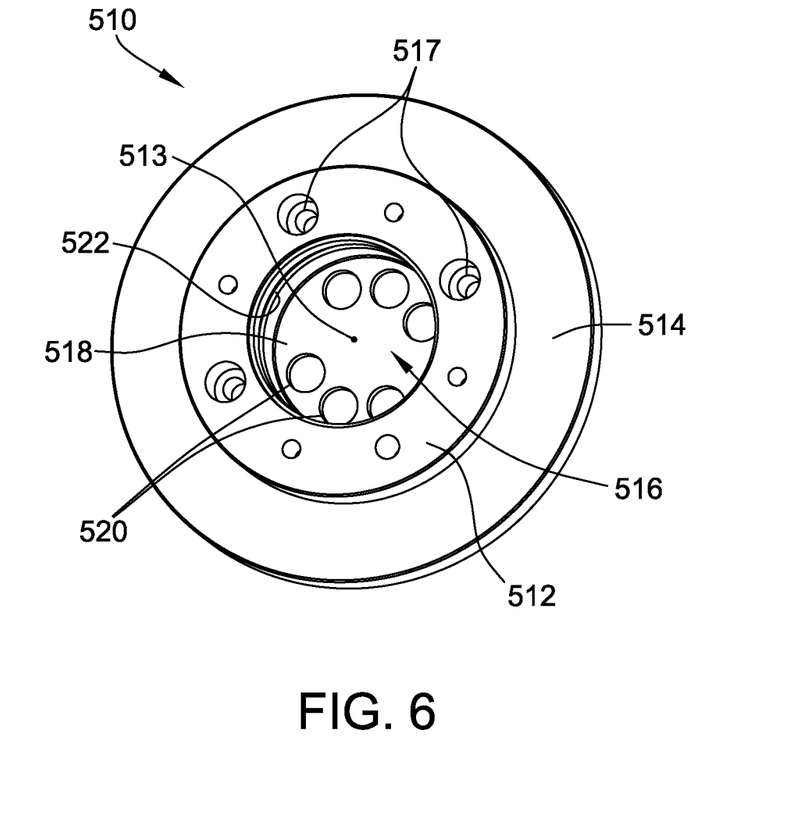
FIG. 6 is a schematic view of an exemplary adapter that may be used to couple to an electric motor stator and to a conduit enclosure.

FIG. 6 is a schematic view of an exemplary adapter 510 that may be used to couple an electric motor stator (not shown) to a conduit enclosure (not shown in FIG. 6). In the exemplary embodiment, adapter 510 includes a center region 512 and an outer region 514. Center region 512 includes mounting holes 517 defined therein that may be used to couple adapter 510 to either the conduit enclosure, or to the electric motor stator, or to both. Center region 512 also includes a center cavity 516 that includes a volume defined therein. Center cavity 516 is bordered by a rear plate 518 that includes a plurality of entry ports 520 defined therein. In the exemplary embodiment, center cavity 516 is substantially circular, and includes a cylindrical volume defined therein. Alternatively, center cavity 516 may have any shape that enables adapter 510 to function as described herein. In the exemplary embodiment, there are six circular entry ports 520 spaced circumferentially about a center 513 of rear plate 518. Alternatively, adapter 510 may include any number, orientation, and shape of entry ports 520 that enables adapter 510 to function as described herein. Grooves 522 are provided along an interior wall of center cavity 516. In operation, grooves 522 assist in retaining the sealing compound inside center cavity 516.

Figure 7:
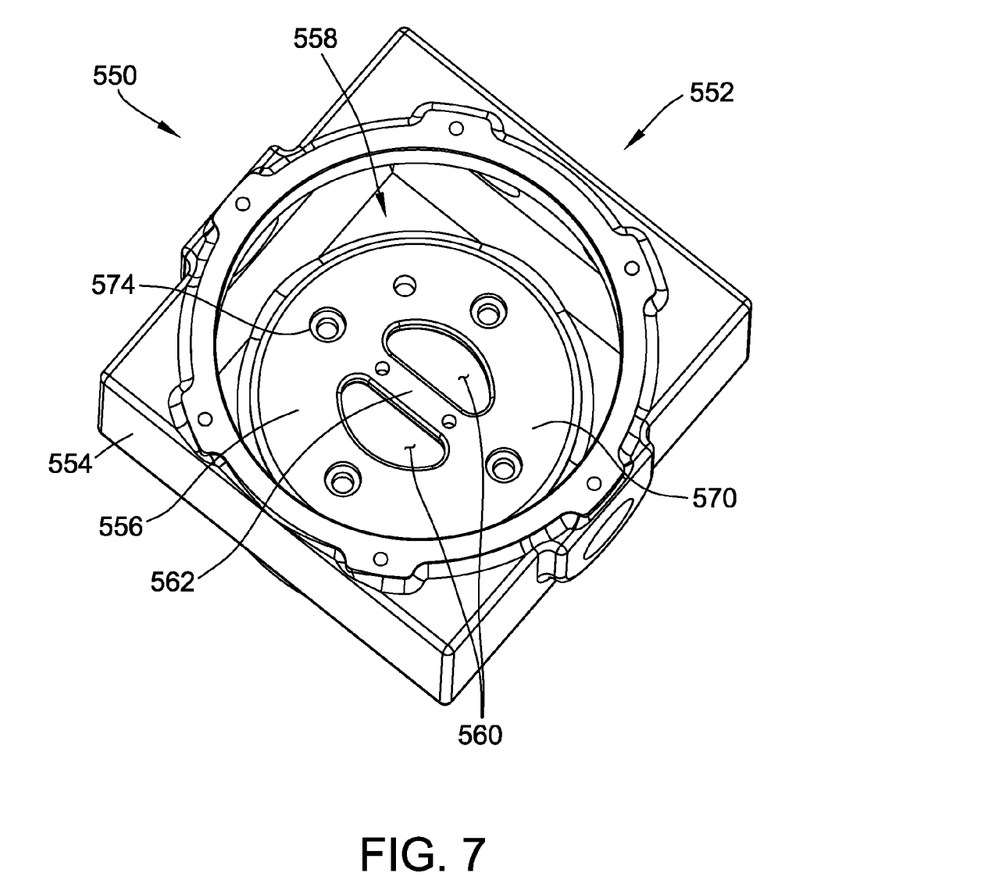
FIG. 7 is a schematic view of a further alternative conduit enclosure that may couple to the adapter shown in FIG. 6.

FIG. 7 is a schematic view of an exemplary conduit enclosure 550 that may couple to adapter 510 (shown in FIG. 6). In the exemplary embodiment, conduit enclosure 550 includes a base member 552 that includes at least one side wall 554 and a rear wall 556. Rear wall 556 includes one or more enclosure entry ports 560 defined therein. Alternatively, enclosure entry ports 560 may be defined in any wall of conduit enclosure 550, such as, without limitation, side wall 554, that enables conduit enclosure 550 to function as described herein. In the exemplary embodiment, enclosure entry ports 560 have a partially semi-circular shape, and are separated by a crossbar 562. Alternatively, conduit enclosure 550 may include any number, orientation, and shape of enclosure entry ports 560 that enables adapter 510 and conduit enclosure 550 to function as described herein. Enclosure entry ports 560 are defined within second area 570. Rear wall 556 also includes mounting holes 574 that may be used to couple conduit enclosure 550 to adapter 510, or to electric motor stator (not shown), or to both. Base member 552 has an interior cavity 558 defined therein that may be capped with a cover member (not shown). Base member 552 may also include a terminal connection block (not shown) that includes at least one terminal (not shown), and that may be coupled to rear wall 556 of base member 552.

Figure 8:
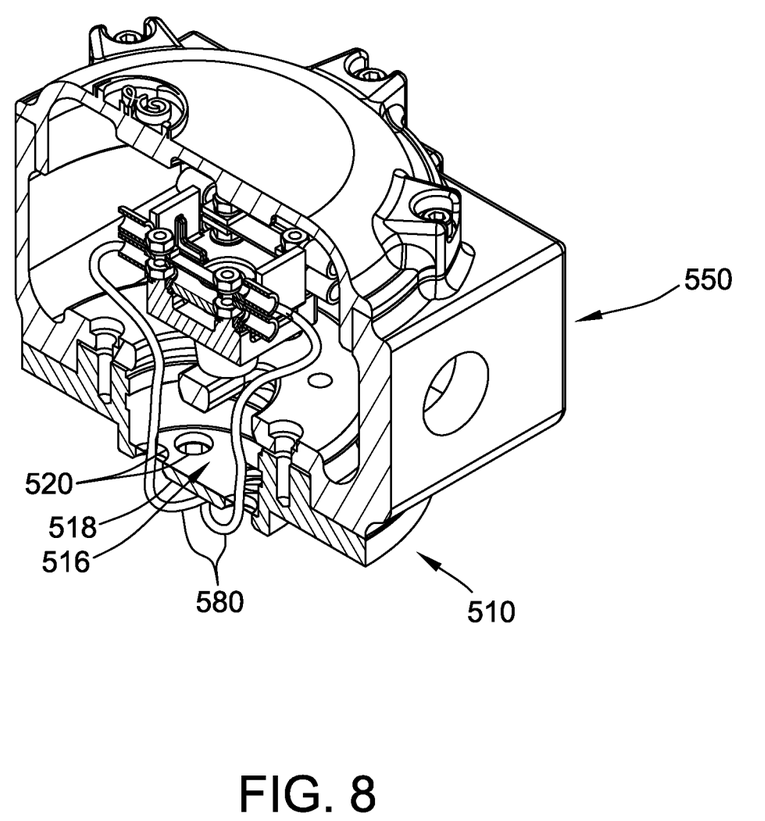
FIG. 8 is a cross-sectional view of the adapter shown in FIG. 6 and the conduit enclosure shown in FIG. 7 shown in an exemplary coupled configuration.

FIG. 8 is a cross-sectional view of adapter 510 and conduit enclosure 550. During assembly, in the exemplary embodiment, adapter 510 is coupled to conduit enclosure 550. Alternatively, adapter 510 may initially be coupled to an electric motor stator (not shown), and then coupled to conduit enclosure 550. Electric leads 580 are extended from the electric motor stator through entry port 520, through enclosure entry port 560 (shown in FIG. 7), and into conduit interior cavity 558 (shown in FIG. 7). The electric lead occupies only some of the volume of center cavity 516. Sealing compound is injected into center cavity 516 such that the remaining volume of center cavity 516 adjacent to each electric lead is substantially filled and such that center cavity 516 is substantially sealed. In some embodiments, insulating paper, such as insulating paper 322 (shown in FIG. 3), may be used on adapter 510 to create a second border of center cavity 516 opposite rear plate 518. Further, in other embodiments, sealing compound may be injected prior to coupling adapter 510 to electric motor stator or prior to coupling adapter 510 to conduit enclosure 550.

Figure 9:
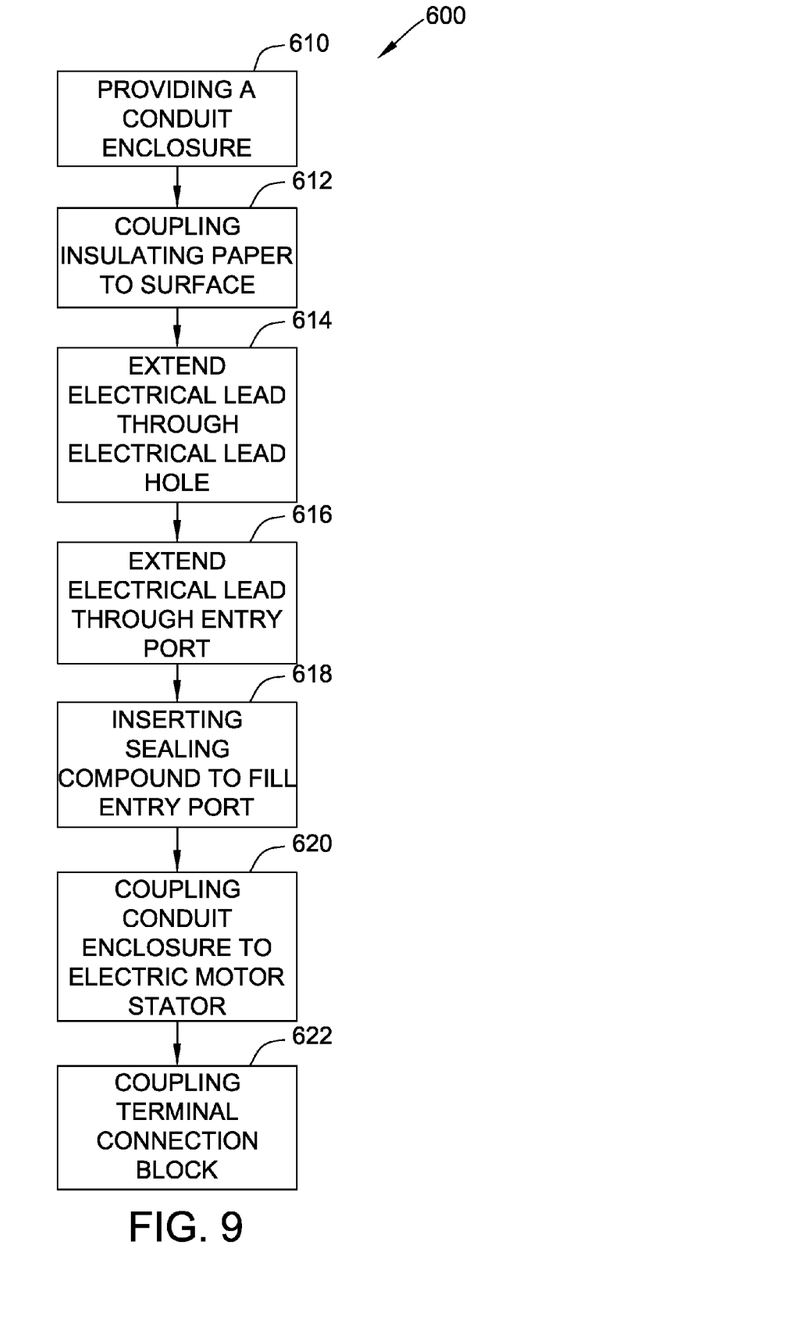
FIG. 9 is a block diagram of an exemplary method that may be implemented to couple conduit enclosures, such as the conduit enclosures shown in FIGS. 1-5, to an electrical motor stator.

FIG. 9 is a block diagram of an exemplary method 600 that may be implemented to couple conduit enclosures, such as conduit enclosures 202 (shown in FIGS. 1-5), to an electrical motor stator (not shown). Initially, a conduit enclosure 202, such as enclosure 202 (shown in FIG. 1), is provided 610. In the exemplary embodiment, insulating paper 322 (shown in FIG. 3) is coupled 612 to conduit enclosure 202, wherein at least one electrical lead (not shown) is extended 614 through electrical lead hole 324 (shown in FIG. 3), and extended 616 through entry port 214 (shown in FIG. 3) into cavity 212 (shown in FIG. 1).

Because the electrical lead only occupies some of the volume defined within entry port 214, sealing compound (not shown) is then inserted 618 into entry port 214 to fill at least a portion of the remaining volume not occupied by the electrical lead such that a seal is created. In the exemplary embodiment, sealing compound is coupled with entry port 214 to fill substantially all of the remaining volume. Conduit enclosure 202 is then coupled 620 to the motor stator. In the exemplary embodiment, a terminal connection block 216 (shown in FIG. 2) is coupled 622 to conduit enclosure 202.

Figure 10:
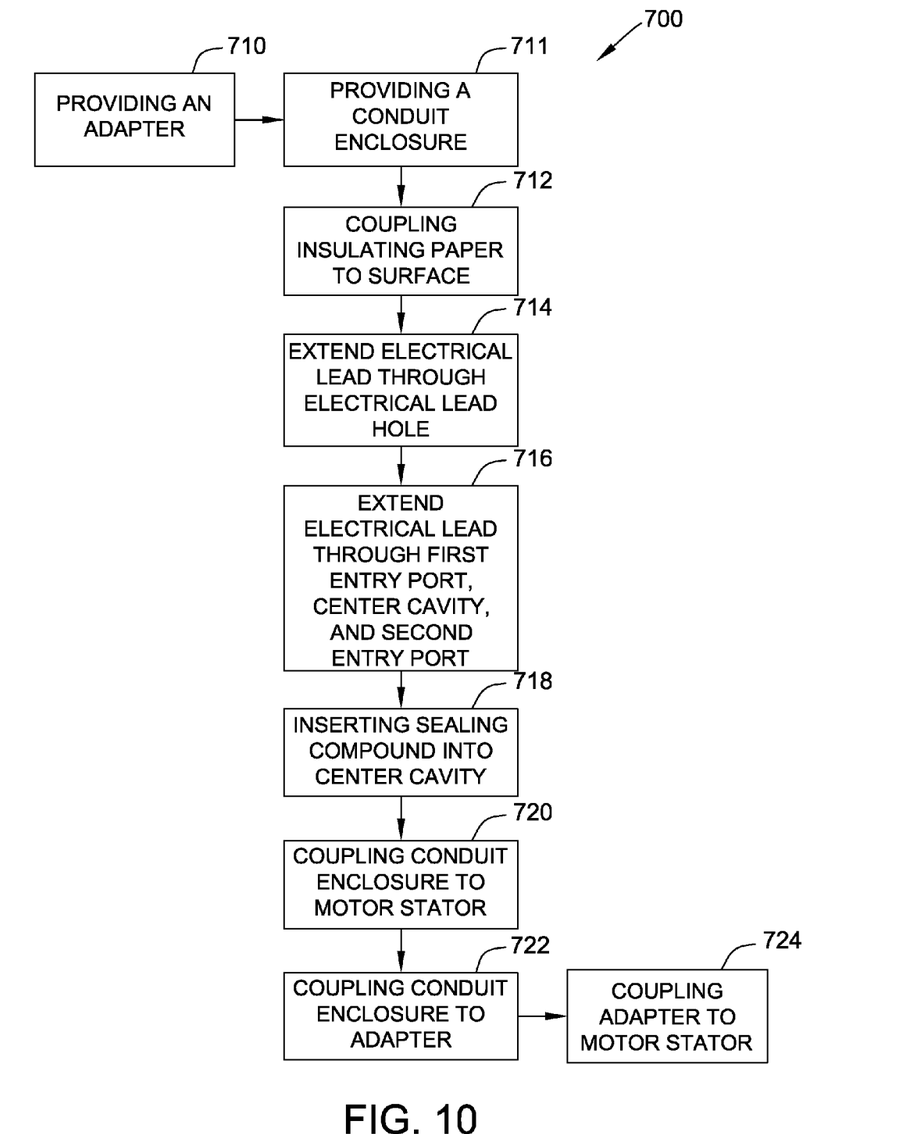
FIG. 10 is a block diagram of an exemplary method that may be implemented to attach the adapter shown in FIG. 6 and the conduit enclosure shown in FIG. 7 to an electric motor stator.

FIG. 10 is a block diagram of an exemplary method 700 of coupling an adapter, such as adapter 510 (shown in FIG. 6), and a conduit enclosure, such as conduit enclosure 550 (shown in FIG. 7), to an electric motor stator (not shown). In the exemplary embodiment, initially an adapter 510 is provided 710 that includes an outer region 514 (shown in FIG. 6) and a center region 512 (shown in FIG. 6), wherein the center region 512 includes a center cavity 516 (shown in FIG. 6).

Also, in the exemplary embodiment, a conduit enclosure 550 (shown in FIG. 7) is provided 711 that includes a base member 204 (shown in FIG. 7) that includes at least one entry port 560 (shown in FIG. 7). In the exemplary embodiment, insulating paper 322 (shown in FIG. 3) is coupled 712 to conduit enclosure 550, as described above, with at least one electrical lead (not shown) extended 714 through an electrical lead hole, such as electrical lead hole 324 (shown in FIG. 3).

Further, in the exemplary embodiment, the electrical lead is extended 716 through entry port 520, through center cavity 516, through enclosure entry port 560, and into enclosure interior cavity 558. Because the electrical lead occupies some of the volume of center cavity 516, sealing compound is then inserted 718 into center cavity 516 to fill at least a portion of the remaining volume of center cavity 516 not occupied by the electrical lead, and to form a seal between the electric motor stator and enclosure interior cavity 558. In some embodiments, sealing compound is inserted 781 to fill substantially all of the remaining volume of center cavity 516 not occupied by the electrical lead.

Moreover, in the exemplary embodiment, conduit enclosure 550 is coupled 720 to the motor stator. In the exemplary embodiment, conduit enclosure 550 is coupled 722 to adapter 510, and adapter 510 is then coupled 724 to the motor stator. Alternatively, any order and arrangement of coupling that enables adapter 510 and conduit enclosure 550 to function as described herein may be used. Further, any order of inserting 718, sealing, and coupling 720, 722, 724 that enables adapter 510 and conduit enclosure 550 to function as described herein may be used.

FIG. 11 is a front view of a portion of an example stator enclosure 800 to which the conduit enclosures described herein may be coupled. Stator enclosure 800 defines an enclosure opening 804 through which electric leads 806 from an electric motor stator extend.

The above-described systems and methods provide a way to sealably couple a conduit box to an explosion-proof electric motor stator in a cost-effective and reliable manner. The embodiments described herein facilitate eliminating the need to apply sealing compound within the motor stator in that sealing compound is only applied within the conduit box. By applying sealing compound only within the conduit box, the risks of sealing compound failing within the motor stator are facilitated to be reduced or eliminated. As such, the sealing compound described herein facilitates extending the useful life of the conduit box. Moreover, an amount of sealing compound required for the assembly is reduced such that assembly is easier and more reliable as compared to known methods. Using less sealing compound also facilitates reducing the necessity of a molding structure to hold the sealing compound in place while it cures, and thus facilitates reducing assembly costs and manpower requirements.

An exemplary technical effect of the methods, systems, and apparatus described herein includes at least one of: (a) eliminating the need to apply sealing compound within the motor stator; (b) eliminating the risk of destroying the motor stator during application; (c) extending the useful life of the conduit box and the motor stator; (d) reducing the amount of sealing compound required for assembly; (e) reducing the necessity of a molding structure within the motor stator during assembly; (f) reducing costs and manpower requirements for assembly.

Exemplary embodiments of systems and methods for seal a conduit box coupled to an explosion-proof electric motor stator are described above in detail. The systems and methods described herein are not limited to the specific embodiments described herein, but rather, components of systems and/or steps of the methods may be utilized independently and separately from other components and/or steps described herein. For example, the methods may also be used in combination with other systems requiring concept extraction systems and methods, and are not limited to practice with only the sealing systems and methods as described herein. Rather, the exemplary embodiments can be implemented and utilized in connection with many other sealing applications.

Although specific features of various embodiments may be shown in some drawings and not in others, this is for convenience only. In accordance with the principles of the systems and methods described herein, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An enclosure system comprising:
   a stator enclosure defining a first enclosure opening;
   an adapter coupled to said stator enclosure, said adapter defining a first entry port and a center cavity having a first volume, said adapter comprising an outer region comprising a first surface, a center region comprising a second surface and extending from said outer region such that said second surface is in a different plane that said first surface, a first plurality of mounting holes formed in said center region second surface, a rear plate defining the first entry port, and an interior wall extending between and interconnecting said center region and said rear plate, said interior wall at least partially defining the center cavity;
   a conduit enclosure coupled to said adapter, said conduit enclosure comprising:
      a base member comprising at least one side wall, a rear wall coupled to said side wall, and an interior cavity, said rear wall defining a second entry port;
      a terminal connection block coupled to said base member and comprising at least one terminal; and
      at least one electrical lead extending from said stator enclosure through said first enclosure opening, through said first entry port, through said center cavity, through said second entry port, and into said interior cavity, said at least one electrical lead occupying a portion of said first volume and leaving a remaining volume; and
   a sealing compound coupled to said adapter such that substantially all of said remaining volume is occupied.

2. The enclosure system of claim 1, wherein said center cavity comprises a substantially cylindrical shape.

3. The enclosure system of claim 2, wherein said adapter further comprises a plurality of entry ports spaced circumferentially about a center point on said rear plate of said adapter.

4. The enclosure system of claim 1, further comprising insulating paper attached to one of said adapter and said conduit enclosure, the insulating paper comprising at least one electrical lead hole defined therein, said insulating paper oriented such that said at least one electrical lead hole is substantially concentrically aligned with said second entry port, wherein said at least one electrical lead extends through said at least one electrical lead hole.

5. The enclosure system of claim 1, wherein said second entry port comprises two semi-circular voids, wherein said conduit enclosure further comprises a support attached to said rear wall between said two semi-circular voids.

6. The enclosure system of claim 1, wherein said rear wall includes a first area having a first thickness and a second area having a second thickness, wherein said second thickness is thicker than said first thickness, and wherein said second entry port is disposed within said second area.

7. The enclosure system of claim 1, wherein said adapter further comprises a first area having a first thickness and a second area having a second thickness, wherein said second thickness is greater than said first thickness, and wherein said first entry port is disposed within the second area.

8. The enclosure system of claim 1, wherein said conduit enclosure further comprises a second plurality of mounting holes oriented in a substantially similar configuration with said first plurality of mounting holes to facilitate coupling said adapter directly to said conduit enclosure.

9. The enclosure system of claim 1, wherein said interior wall defines at least one groove configured to retain said sealing compound within the center cavity.

10. A method of attaching an adapter and a conduit enclosure to a stator enclosure, the method comprising:
providing an adapter defining a first entry port and a center cavity having a first volume, the adapter including an outer region comprising a first surface, a center region comprising a second surface and extending from the outer region such that said second surface is in a different plane that said first surface, a first plurality of mounting holes formed in the center region second surface, a rear plate defining the first entry port, and an interior wall extending between and interconnecting the center region and the rear plate, the interior wall at least partially defining the center cavity;
providing a conduit enclosure including a base member, at least one terminal connection block coupled to the base member, the base member including an interior cavity, at least one side wall, and a rear wall coupled to the side wall and comprising a second entry port;
extending at least one electrical lead from the stator enclosure through the first entry port, through the center cavity, through the second entry port, and into the interior cavity, the at least one electrical lead occupying a portion of the first volume and leaving a remaining volume;
applying a sealing compound to fill a portion of the remaining volume such that a seal is formed between the conduit enclosure and the stator enclosure; and
attaching the conduit enclosure to the stator enclosure.

11. The method in accordance with claim 10, further comprising applying sealing compound to fill substantially all of the remaining volume.

12. The method in accordance with claim 10, further comprising attaching the adapter to the conduit enclosure.

13. The method in accordance with claim 12, wherein the conduit enclosure includes a second plurality of mounting holes, and wherein attaching the adapter to the conduit enclosure comprises attaching the conduit enclosure to the adapter using at least some of the first plurality of mounting holes and at least some of the second plurality of mounting holes.

14. The method in accordance with claim 10, further comprising attaching the adapter to the stator enclosure.

15. The method in accordance with claim 10, further comprising:
attaching insulating paper to one of the adapter and the conduit enclosure, the insulating paper including at least one electrical lead hole defined therein, wherein attaching the insulating paper includes attaching the insulating paper such that the at least one electrical lead hole is substantially concentrically aligned with the second entry port; and
extending the at least one electrical lead through the at least one electrical lead hole.

16. The method in accordance with claim 10, wherein said applying sealing compound includes applying fast curing compound.

17. The method in accordance with claim 10, wherein the first entry port is one of a plurality of first entry ports circumferentially oriented about a center on the rear plate, wherein the second entry port defines two semi-circular voids, wherein the conduit enclosure further includes a support attached to the rear wall separating the two semi-circular voids, said method further comprising attaching the adapter to the conduit enclosure such that the two semi-circular voids are substantially concentrically aligned with the plurality of entry ports.

18. The method in accordance with claim 10, wherein the interior wall defines at least one groove configured to retain the sealing compound within the center cavity.

* * * * *